May 3, 1955  E. B. SMITH  2,707,332
MEASURING APPARATUS, MORE PARTICULARLY
FOR ELECTRIC CABLES AND WIRES
Filed April 13, 1954
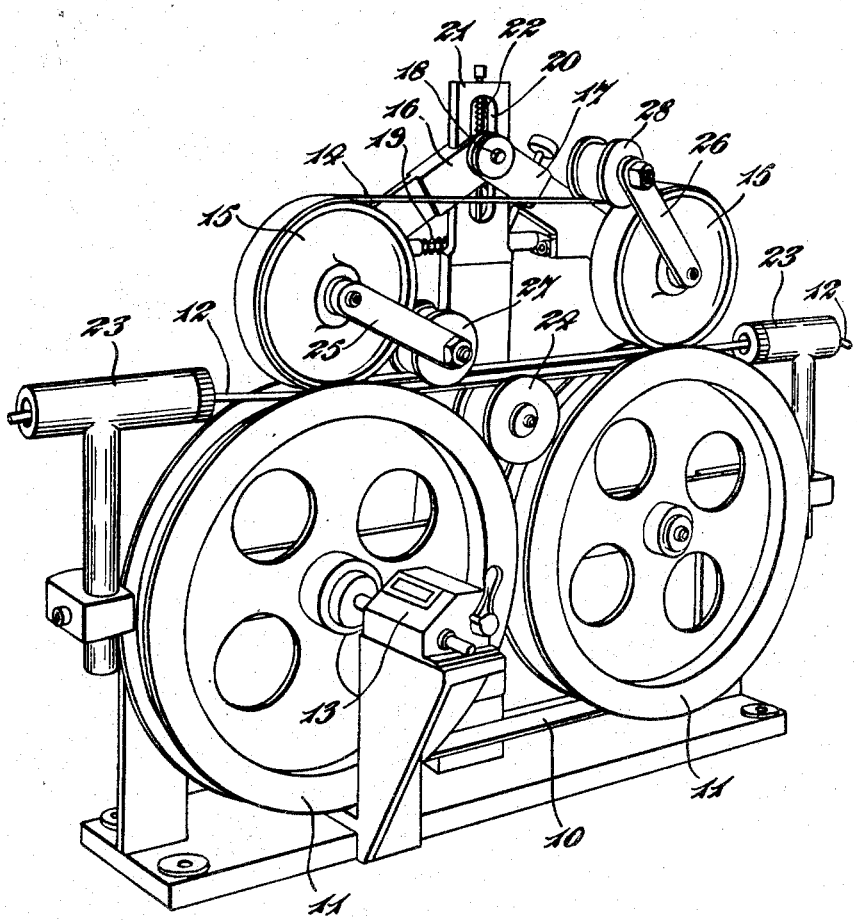
Eric Barnaby Smith
INVENTOR
By Richardson, David and Norden
his ATT'ys.

United States Patent Office 2,707,332
Patented May 3, 1955

2,707,332

MEASURING APPARATUS, MORE PARTICULARLY FOR ELECTRIC CABLES AND WIRES

Eric Barnaby Smith, Bexley Heath, England

Application April 13, 1954, Serial No. 422,879

Claims priority, application Great Britain April 21, 1953

3 Claims. (Cl. 33—134)

This invention relates to measuring apparatus, more particularly for electric cables and wires. The usual two-wheel measuring machines which are employed for measuring lengths of electric cables and wires are inaccurate and, in fact, with certain types of cables are incapable of measuring to the accuracy of an order of 1%. It is, therefore, the chief object of the present invention to overcome this disadvantage and to provide a measuring machine which, whilst it is more accurate than the machines heretofore proposed, will still be of simple and robust construction.

The measuring machine according to the present invention is characterised in that the cable or wire to be measured is passed between two endless bands, one of which is loaded against the other to grip the wire, whereby the possibility of slip, or inaccurate measurement due to the profile of the cable, is materially reduced, if not entirely eliminated.

Conveniently the top endless band is carried by a framework which is pivoted above the band at a point intermediate its ends, so that, should the upper endless band tend to jump during the measuring process, the said framework at the upper end will turn about its pivot and grip the wire more firmly at the end which is not jumping.

In order that this invention may be the more clearly understood and readily carried into effect, reference may be made to the accompanying drawing, which is a perspective view of the preferred form of a cable measuring machine according to the present invention.

Referring now to the accompanying drawing, the measuring machine therein illustrated comprises a lower endless band 10 carried by end drums or rollers 11, at least one of which has a periphery of a predetermined length so that the length of the cable or wire 12 can be ascertained by a suitably graduated revolution counter 13 connected to the roller or drum with the predetermined peripheral length. Means are provided for keeping the endless band taut and the rollers may be peripherally grooved to prevent side slip of the band 10.

Above the lower endless band 10 is an upper endless band 14 carried on rollers 15 mounted at the ends of a pair of arms 16, 17 which are pivoted together at their upper ends as at 18 and are urged apart by means of one or more compression springs 19 which thus keep the band taut. The pivot 18 of the arm structure 16, 17 is freely mounted within a vertical slot 20 in a standard 21 so that the upper endless band together with its supporting structure is free to rise and fall as a unit to accommodate different diameters of cable, whilst, at the same time, the upper endless band 14 is loaded against the lower endless band 10 by the action of gravity and by means of a compression spring such as 22 bearing upon the pivot 18 of the two arms 16, 17.

In use the cable 12 to be measured is fed between the two endless bands 10 and 14, preferably through a tube guide 23 to remove kinks and is drawn out at any desired speed, the length of cable which has passed between the bands 10 and 14 being indicated by the indicator 13.

It will be seen that with such a machine there is little, if any, risk of inaccuracy of measurement due to one upper end roller 15 jumping off the corresponding lower roller 11. Should such jumping occur, the upper endless band structure will tend to pivot about the pivot 18 as a unit and will cause the roller at the opposite end of the upper endless band 14 to grip the cable more firmly. At all times the cable 12 will be gripped at some point along the two endless bands and complete slip over the whole of the co-operating runs of the endless bands 10 and 14 is a virtual impossibility, given reasonably accurate assembly and initial adjustment. Furthermore, due to the comparatively long distance over which the cable is gripped between the two bands, the accuracy of measurement will not be affected by the profile of the cable 12, even should it be a multiple twisted cable, since measurement is no longer due to what is, in effect, a point contact with the cable, but is effected by a substantially line contact of the bands with the cable, which line will not be affected by the varying profile of the cable.

The machine so far described is a simple embodiment of the present invention. If desired, a comparatively small roller 24 may be provided underneath the top run of the lower endless band 10 to support the same intermediate the end rollers and to ensure that there shall be no appreciable sag between the end rollers which would take the band out of contact with the cable being measured. Furthermore, arms 25 and 26 mounted to pivot about the axes of rotation of the end rollers 15 of the upper endless band 14 may extend inwardly and carry, at their ends, rollers 27 and 28, the former of which rests on the lower run of the upper endless band to one side of the roller 24, whilst the other of which, 28, rests on the upper run of the upper endless band to the opposite side of the roller 24. Such an arrangement will serve still further to reduce the possibility of slip and to ensure that the upper endless band 14 maintains support.

Also, although in the embodiment above described the indicator has been shown as being connected to one of the end rollers 11 of the lower endless band 10, it will be obvious that said indicator, if desired, may be connected to one of the end rollers of the upper endless band 14, since it is an outstanding feature of the present invention that slip between the cable and the endless bands and likewise slip between the bands themselves and their end rollers is avoided.

Although the present invention is particularly applicable to the measurement of electric cables and wires, and has special advantages in connection therewith, it will be obvious that the apparatus may be used for accurate measurement of other material such as, for example, cord or rope.

I claim:

1. In a measuring apparatus for electric cables and the like, the combination of an upper and a lower endless band, end rollers to carry each band in meeting contact with the other band along a span between the end rollers to grip the cable to be measured traveling with and between the said span of receiving bands, at least one of said rollers being provided with an accurate periphery, and being operatively connected to a counter member, and a supporting structure for the rollers carrying the upper band comprising a standard having a slot in its upper end, a sliding pivot arranged in said slot, oppositely projecting arms mounted at their upper ends on said sliding pivot, and provided at their free ends with bearings to carry the upper end rollers, and spring means between the arms tending to normally force them apart, thereby automatically adjusting the upper end rollers and band to accommodate cables and the like having different diameters.

2. In a measuring apparatus for electric cables and the like, the combination of an upper and a lower endless band, and rollers to carry each band in meeting contact with the other band along a span between the end rollers to grip the cable to be measured traveling with and between the said span of receiving bands, at least one of said rollers being provided with an accurate periphery, and being operatively connected to a counter member, and a supporting structure for the rollers carrying the upper band comprising a standard having a slot in its upper end, a sliding pivot arranged in said slot and a spring mounted in the slot yieldably urging the pivot downwardly therein, oppositely projecting arms mounted at their upper ends on said sliding pivot and provided at their free ends with bearings to carry the upper end rollers, and spring means between the arms tending to normally force them apart, thereby automatically adjusting the upper end rollers and band to accommodate cables and the like having different diameters.

3. A measuring apparatus for cables and the like as claimed in claim 2, including arms pivotally supported on the bearings for the rollers carrying the upper band and grooved rollers for the free ends of the latter arms to bear on the spans of the upper band between its end rollers to maintain the band in alignment with the upper end rollers.

References Cited in the file of this patent

UNITED STATES PATENTS

| | | |
|---|---|---|
| 1,415,483 | Reichmann | May 9, 1922 |
| 2,087,335 | Seeley | July 20, 1937 |

FOREIGN PATENTS

| | | |
|---|---|---|
| 239,740 | Switzerland | Apr. 16, 1946 |
| 635,197 | Great Britain | Apr. 5, 1950 |